(No Model.)  F. H. RICHARDS.  3 Sheets—Sheet 1.
WEIGHING APPARATUS.

No. 573,420.  Patented Dec. 15, 1896.

Witnesses:  Inventor:

(No Model.)

F. H. RICHARDS.
WEIGHING APPARATUS.

No. 573,420.   Patented Dec. 15, 1896.

3 Sheets—Sheet 2.

Witnesses:
J. L. Edwards Jr.
Fred. J. Dole.

Inventor.
F. H. Richards.

(No Model.) 3 Sheets—Sheet 3.

F. H. RICHARDS.
WEIGHING APPARATUS.

No. 573,420. Patented Dec. 15, 1896.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

WEIGHING APPARATUS.

SPECIFICATION forming part of Letters Patent No. 573,420, dated December 15, 1896.

Application filed June 15, 1896. Serial No. 595,535. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing Apparatus, of which the following is a specification.

This invention relates to weighing apparatus embodying a plurality of weighing-machines, each of which is adapted to weigh automatically a definite load of material, the object of the invention being to so combine the several separate mechanisms that the discharge of each one shall be controlled by another of said mechanisms automatically, and will not be affected by the automatic action of the machine in which the load of material is made up.

Figure 1:
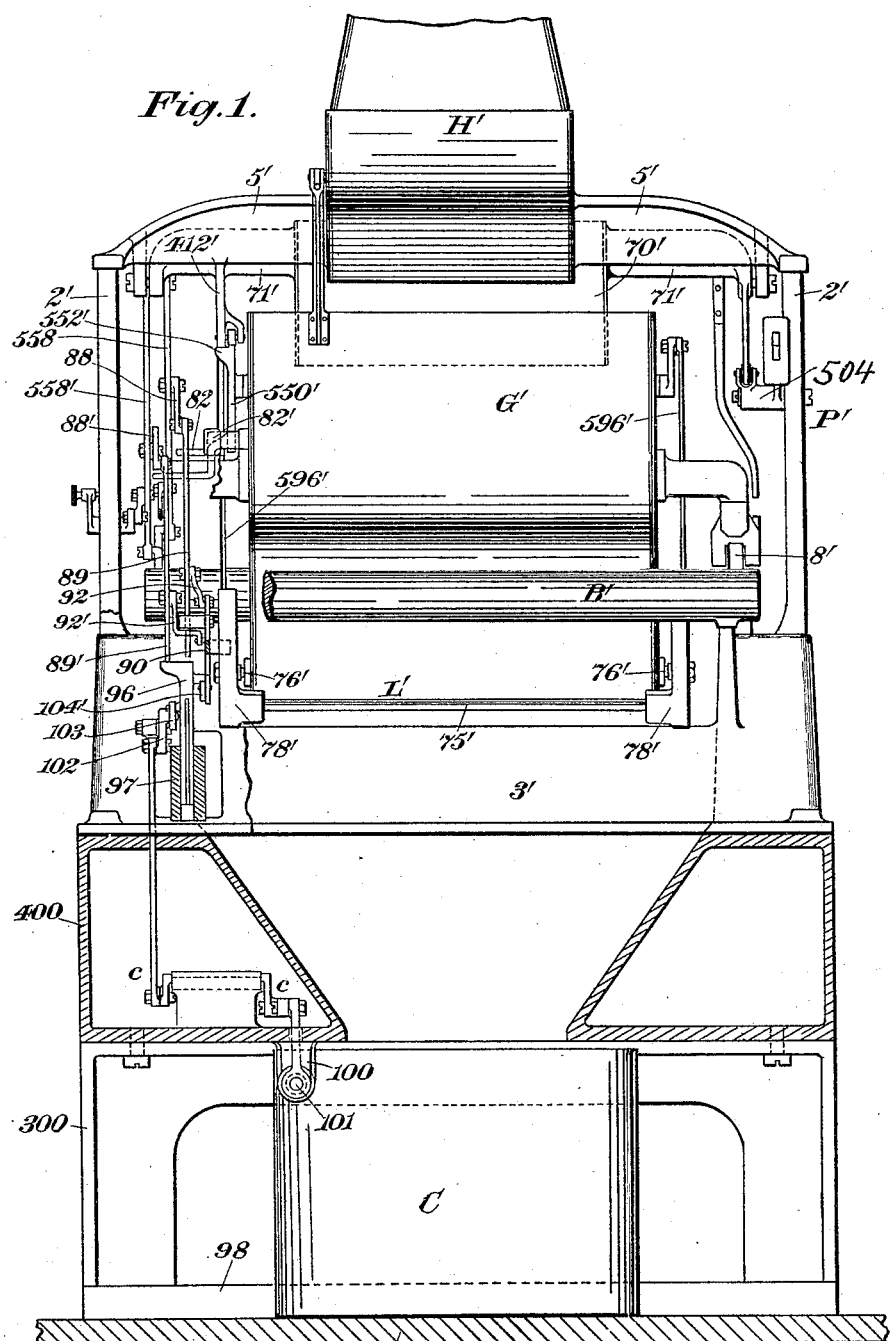
Figure 2:
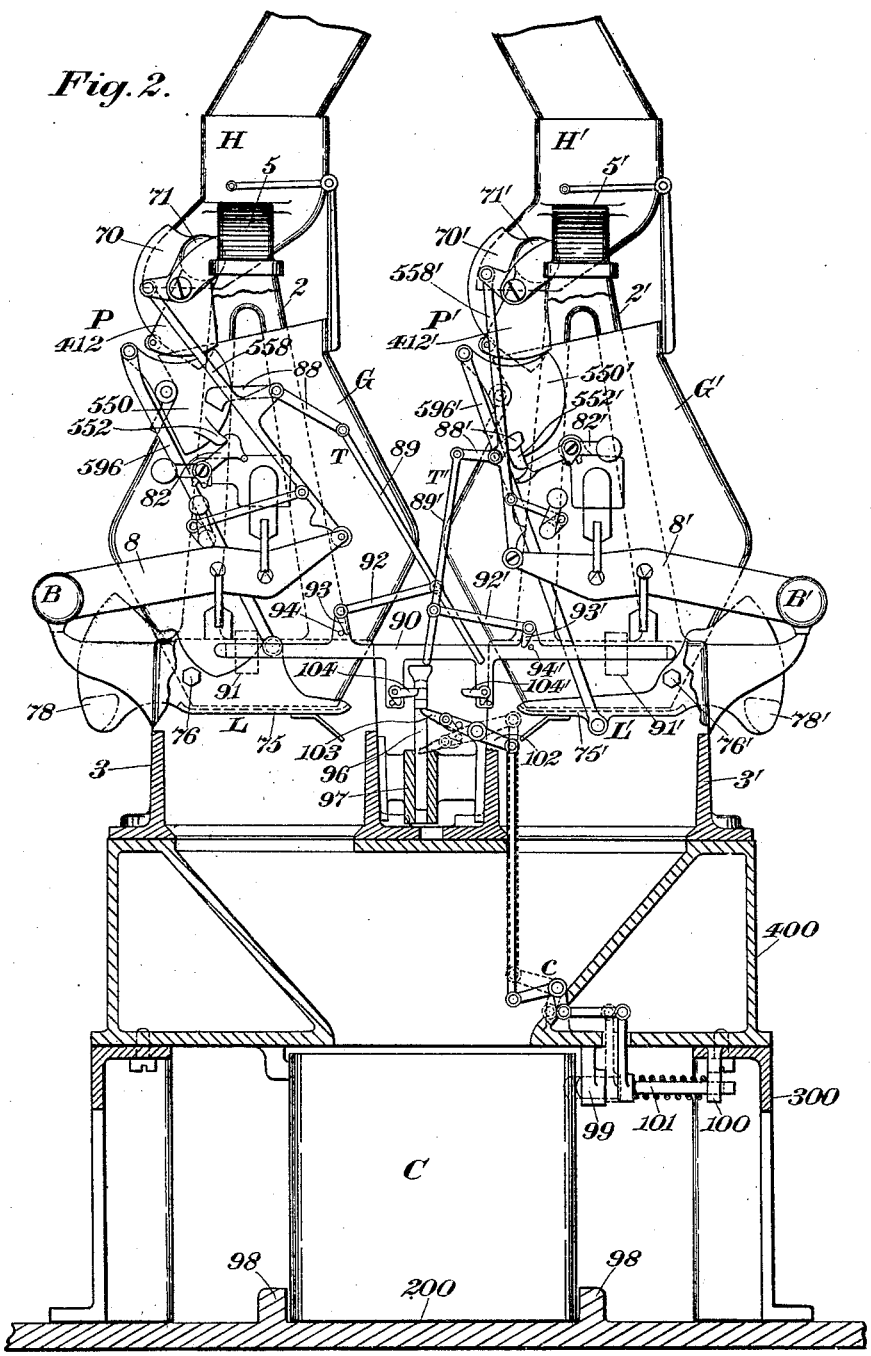
Figure 3:
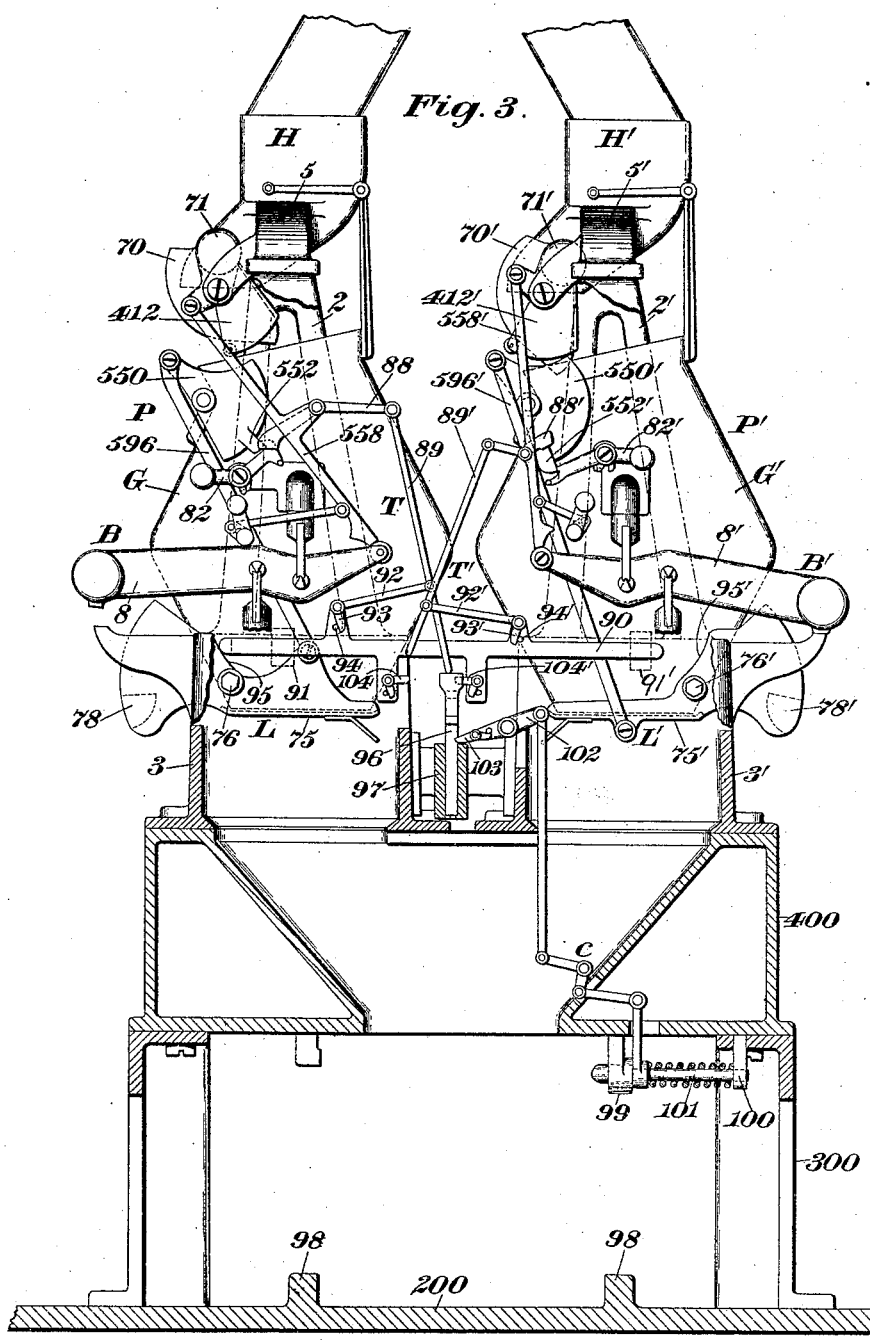

In the drawings accompanying and forming part of this specification, Figure 1 is a sectional front elevation of a weighing apparatus embodying my present invention, illustrating two weighing-machines so connected that the discharge of each will be controlled from the other machine. Fig. 2 is a sectional side elevation of the same, illustrating both machines in position for receiving supplies of material from the usual supply-chute. Fig. 3 is a similar view illustrating one of the machines (the right-hand one) having discharged its load and risen to receive a new load and the other (the left-hand machine) in position to be discharged after the load therein is completed, said last-named machine having descended below the poising-line.

Similar characters designate like parts in all the figures of the drawings.

My invention embodies as its essential features a plurality of weighing-machines, each of which is automatically dischargeable by another of said machines, and it is in the nature of an improvement upon the apparatuses shown, described, and claimed in Letters Patent granted to me May 5, 1896, No. 559,749, and August 4, 1896, No. 565,229, in each of which two weighing-machines are illustrated, one having its discharge controlled by the other; but in said patents one of the machines represented constitutes a primary mechanism and the other a secondary mechanism, the secondary machine having its discharging operation in both instances consequent upon the discharge of the primary machine.

In contradistinction to such an operation the discharge of each weighing-machine in the present apparatus is dependent upon the prior discharge of another, the construction and organization of the several machines being such that none is a secondary mechanism exclusively, but each in turn serves both as a primary machine to control the discharge of another and as a secondary machine governed by the operation of another, it being understood that one of the machines will be started and the operation of the others—that is, the unloading of their buckets—will follow automatically.

While I do not limit myself to the use of any particular weighing-machine I prefer to employ automatic weighing-machines of the "single-bucket" type or class substantially similar to the improved machine described and claimed in Letters Patent No. 548,840, granted to me October 29, 1895, to which reference may be had.

Any suitable framework may be employed for operatively supporting the weighing-machines and other devices comprised in my improved apparatus. I have illustrated at 200 a base supporting a pair of superimposed frames, the lower of which is represented at 300, constituting a supporting and guiding means for positioning the boxes or other receptacles into which the material from the weighing-machines is delivered, the upper frame being shown at 400 as chambered and forming a discharge-chute common to the weighing-machines employed.

Two weighing-machines substantially similar in construction and organization, except as herein shown, are illustrated at P and P', mounted on the frame or support 400. Each of these weighing-machines preferably comprises two side frames or uprights connected by a top plate or beam and mounted upon a chambered support or base communicating with the discharge-chute in the upper portion 400 of the base of the apparatus. The side frames at one side of the apparatus are designated, respectively, by 2 and 2', the connecting top plates by 5 and 5', and the bases by 3 and 3', the top plates serving as a means for sustaining chutes or hoppers H and H' of ordinary construction.

The beam mechanisms are designated in a general way by B and B' and are shown comprising counterweighted single beams 8 and 8', which may be suitably mounted upon the bases 3 and 3', and may also carry suitable supports for the bucket mechanisms.

Each of the bucket mechanisms is shown comprising two members, one of which is shiftable relatively to the other for discharging the bucket-load. Bucket-closers (designated in a general way by L and L') are represented constituting such shiftable members or load-dischargers. These bucket-closers are illustrated consisting of suitably-formed plates or closers proper, 75 and 75', pivotally supported at 76 and 76', adjacent to the opposite sides of the discharge-outlets of the buckets G and G' and preferably have the usual counterweighted arms 78 and 78' for returning the closers to their normal or shut positions. (Shown in Figs. 2 and 3.)

Each of the closers or load-dischargers is preferably supported by means of an inverted toggle connection, these connections being represented as comprising rockers 550 and 550', suitably supported by the buckets G and G' and connecting-rods 596 and 596', pivoted to the rockers and to the closers in such a manner that when either closer is shut the two pivots of the connecting-rod will be nearly in line with and the upper of said pivots will be above the rocker-pivot, so that said rocker when engaged by a latch or similar holding device may be secured against oscillatory movement with a minimum pressure thereon.

For the purpose of holding the bucket-closers against shifting the usual latches (represented at 82 and 82') are shown having suitable detents for engaging coöperating detents formed on the rocker-arms 552 and 552'. When the parts are in their closed positions, each of these latches will usually be released by a downward movement controlled by a valve-operated member, as will be hereinafter more particularly described.

For the purpose of controlling the supply-streams which flow from the chutes or hoppers H and H' valves 70 and 70' are illustrated, each of which is substantially similar in construction and mode of operation to the improved valve described in Letters Patent No. 535,727, granted to me March 12, 1895, to which also reference may be had. These valves will preferably be pivotally supported for oscillatory movement beneath the mouths or discharge-outlets of said hoppers and will have suitable balance-weights 71 and 71', said valves being closed at the proper times by the usual counterweighted levers common to this class of machines, one of which is shown at 504, Fig. 1.

For effecting the opening movement of the valve 70 the means disclosed in Letters Patent No. 548,839, granted to me October 29, 1895, may be employed. Long thrust-rods are represented at 558 and 558', connected to the valves 70 and 70' at points to the rear of their centers of movement, the free ends of said thrust-rods being in position for operation from valve-opening actuators, which in the present instance are shown as the inner ends of the scale-beams 8 and 8', the usual antifriction-rolls being employed for engaging the ends of the thrust-rods.

It will be obvious that after either of the bucket-loads is discharged the return of the scale-beam of the discharged machine will be effective to force the corresponding thrust-rod upward and thereby open the valve to which said rod is connected.

The weighing-machines which have been hereinbefore described are designed to operate automatically in substantially the same way as the machines illustrated in the patents hereinbefore referred to so far as the operation of making up the loads in the buckets of the different machines is concerned, and, moreover, such making up of the loads may not (and usually will not) take place at the same time; but after the bucket-load has been completed in either machine such load will not be discharged by the operation of such machine unless its discharging means shall have been brought into operative position by the action of the other machine. Hence, as will be apparent, a latch-tripper adapted for releasing the latch of one machine will not be effective by the operation of that machine, but will be rendered effective by the opposite weighing mechanism, and so the latch-trippers of the several machines will usually be separately and not simultaneously effective for releasing the several latches and load-dischargers with which said trippers coöperate.

In my Patent No. 548,840, before referred to, the latch actuator or tripper is represented carried by and fixed on the thrust-rod by which the valve is opened when the valve-opening actuator becomes effective to operate said rod to open the valve; but as such a tripper must operate to release the latch for the load-discharger or bucket-closer when the load in the bucket is made up I have represented the latch-trippers of the machines illustrated in the present case pivotally carried by the thrust-rods 558 and 558' and so constructed and organized that neither will be effective to release its latch by the completion of a load in its bucket. Said thrust-rods are shown herein having pivoted thereon trip-levers 88 and 88', the outer ends of these levers being illustrated as adapted to strike and release the latches 82 and 82', respectively, while the inner ends of said trip-levers are represented as pivoted to trip-rods, such as 89 and 89', each of which is operative by a latch-tripper shifter, such as 90, preferably disposed in a substantially horizontal position and adapted to reciprocate transversely to the weighing-machines. This shifter is illustrated slidably mounted in suitable openings in shoulders or projections 91 and 91' of the bases 3 and 3' and preferably connected with the latch-trippers, which are designated herein in a general way by T and T', and are shown each comprising one of the trip-levers 88 or 88', a trip-rod, such as 89 or 89', and a link, such as 92 or 92', these links being illustrated connecting their respective trip-rods with different points in the latch-tripper shifter 90.

For the purpose of limiting the downward movements of the trip-rods 89 and 89' the links 92 and 92' are shown having stop-arms 93 and 93', adapted to engage corresponding pin-stops 94 and 94' on the shifter 90.

The connections of the trip-rods with the shifter insure the positive actuation of the lower ends of said rods in lateral directions whenever the shifter is reciprocated from one extreme position to the other, and for the purpose of positively operating said shifter and thereby positively setting the lower ends of said trip-rods in their operative and inoperative positions, the closers L and L' are represented herein having thereon and preferably above the axis thereof shifter-actuating stop-cams 95 and 95', each of which cam-faces is so shaped that on the opening of a bucket-closer the shifter will be actuated and the trip-rod of that machine, the load of which has just been discharged, will be shifted to an inoperative position with respect to a latch-tripper actuator, (hereinafter more particularly referred to,) while the trip-rod of the other machine which has not been discharged will be brought into operative relation with such latch-tripper actuator to permit the discharge of the completed load from the bucket of said machine.

The latch-tripper actuator may be any suitable resistance member against which the lower ends of the trip-rods may be stopped separately, so as to permit the trip-lever connected with such rod to release the latch with which it coöperates. In the present case, however, I have shown this actuator at 96 as a shiftable member supported for vertical movement in a guide 97 between the bases 3 and 3' of the weighing-machines P and P', this latch-tripper actuator being represented having its upper end or face in position to engage the lower ends of the trip-rods 89 and 89' alternately.

The latch-tripper actuator shown herein is especially designed and intended to be operated to its working position by the positioning of the load receiver or box, which is placed beneath the mouth of the discharge-chute in a manner similar to that described in my Patent No. 559,211, granted April 28, 1896; but it should be understood that, so far as the operation of the apparatus in automatically and alternately discharging two weighing-machines is concerned, the use of such load receiver or box, with its operated connections, for raising the latch-tripper actuator, is unnecessary, as a properly-positioned abutment or stop in fixed relation with the framework is all that is necessary to cause the weighing-machines to empty their loads alternately. In the present case the lowermost base 300 is illustrated having box-guiding means, such as the guides 98, for locating a box or case, such as C, in position to be filled. The frame 400 is represented having a depending member or hanger 99 and the frame 300 a corresponding projection 100, in which works an operating-arm (shown as a spring-pressed bolt 101) for actuating the latch-tripper actuator 96 to raise the same to its working position, suitable operating connections, such as links and levers, &c., (designated in a general way by c and illustrated connected with a lever 102, having at its outer end a by-pass stop 103,) forming the means for raising the actuator 96.

It will be apparent that on the placing of the box C in position the operating-arm 101 will be forced outward, and the actuator 96 will thereupon be carried to the position shown, for instance, in Fig. 2, in which it will serve to check the downward movement of that trip-rod the lower end of which has been brought into line with the actuator 96, and that such trip-rod, being then a rigid abutment, will permit its trip-lever 88 or 88', as the case may be, to oscillate about a pivot between the trip-rod and trip-lever as a center and release the latch with which such trip-lever coöperates.

The shifter 90 is also shown in these views having a pair of by-pass stops 104 and 104' in position alternately to engage and support the actuator 96, according to the position to which the shifter 90 may be moved, the stop 104 serving to support the actuator 96 when the trip-rod 89' is in its operative position, while the stop 104' supports said actuator when the trip-rod 89 is in a working position.

It will be seen from the foregoing that the latch-trippers will be alternately effective, and when either of said trippers is in its inoperative position no obstruction will be presented to the downward movement of the trip-rod thereof, and hence the weight of the loaded bucket will not be exerted upon said trip-lever at the point of connection of said lever with its thrust-rod, but said trip-lever will swing ineffectively about such point of connection. On the other hand, when the end of the trip-rod is stopped against the working face of the actuator 96 the force of the closing-valve will be exerted at the point of connection of the trip-lever with its thrust-rod and the latch will be released by the trip-lever.

From the foregoing description of the construction and organization of the several parts of my improved weighing apparatus it will be clear that my invention contemplates in addition to the subject-matter stated at the beginning of this specification the provision of a plurality of weighing-machines and interdependent discharging means, whereby said machines are automatically dischargeable, respectively and preferably successively, in a predetermined order, each by another, the discharge of each machine being controlled in the present instance by the next preceding machine on the discharge of said other or preceding machine, it being understood that these machines may be simultaneously loadable, as is usually the case. Moreover, each machine on discharging is automatically settable to a non-discharging position, in which it will remain until another operation thereof is permitted by some other machine, as the load-discharging means or closer-releasing means are separately effective and are controlled each by another of said machines or bucket-closers.

The operation of weighing apparatus constructed and organized in accordance with my invention as herein set forth is as follows: Each of the supply-chutes will furnish material to its valve, and this material will flow into the bucket until the load causes said bucket to descend, whereupon the valve will first cut off the main stream, and, after the load is completed, the drip-stream, the descent of the rod 558 or 558', as the case may be, permitting this closing movement. As soon as the valve is closed the stop or limiter 412 or 412' will be carried out of engagement with the rocker 550 or 550', and thereupon, if the trip-rod is in contact with the trip-rod actuator 96, the latch will be released by the trip-lever, the closer will be shifted to discharge the load, and the rocker will be carried into position to prevent the opening of the valve until the closer is again latched. If, however, the trip-rod is not in contact with its actuator, the latch will not be released by the trip-lever until said trip-rod is carried to its operative position by the discharge of the other bucket. On the rise of a bucket after discharging the valve will be locked by the rocker against opening until the closer is shut, and as soon as the closer is latched the beam mechanism will operate through the rod 558 or 558' to reopen the valve in the manner described in my patents herein mentioned.

Having described my invention, I claim—

1. The combination of a plurality of weighing-machines and interdependent discharging means, substantially as described, whereby said machines are automatically dischargeable, respectively, each by another.

2. The combination of a plurality of weighing-machines and interdependent discharging means, substantially as described, whereby said machines are automatically dischargeable, respectively, each by another, and each is automatically settable to a non-discharging position.

3. The combination with a pair of automatic weighing-machines having shiftable load-dischargers, latches for said load-dischargers, and alternately-effective latch-trippers; of a latch-tripper shifter operative by said load-dischargers, alternately, for shifting the corresponding latch-tripper to its inoperative position and the other latch-tripper to its operative position.

4. The combination with a pair of automatic weighing-machines having shiftable load-dischargers, latches for said load-dischargers, and alternately-effective latch-trippers; of a reciprocatory latch-tripper shifter operative by said load-dischargers, alternately, for shifting the corresponding latch-tripper to its inoperative position and the latch-tripper to its operative position.

5. The combination with a pair of automatic weighing-machines having shiftable load-dischargers, latches for said load-dischargers, and latch-trippers pivotally connected with a latch-tripper shifter; of a latch-tripper shifter operative by said load-dischargers, alternately, for shifting the corresponding latch-tripper to its inoperative position and the other latch-tripper to its operative position.

6. The combination with a pair of automatic weighing-machines having buckets, bucket-closers, latches for said closers, alternately-effective latch-trippers, and shifter-actuating stop-cams on the closers; of a latch-tripper shifter operative by said cams, alternately, for shifting the corresponding latch-tripper to its inoperative position and the other latch-tripper to its operative position.

7. The combination with a pair of automatic weighing-machines having buckets, bucket-closers, latches for said closers, alternately-effective latch-trippers, and shifter-actuating stop-cams on the closers above the axes of said closers; of a latch-tripper shifter operative by said cams, alternately, for shifting the corresponding latch-tripper to its inoperative position and the other latch-tripper to its operative position.

8. The combination with a pair of automatic weighing-machines having shiftable load-dischargers and separately-effective load-discharger-releasing means shiftable alternately to their operative positions, each by the other machine; of an actuator for said releasing means shiftable into and out of operative relation therewith.

9. The combination with a pair of automatic weighing-machines having shiftable load-dischargers, latches for said load-dischargers, and separately-effective latch trippers shiftable alternately to their operative positions, each by the other load-discharger; of a latch-tripper actuator shiftable into and out of operative relation with said latch-trippers.

10. The combination with a pair of automatic weighing-machines having buckets, bucket-closers, latches for said closers, and latch-trippers, each having a trip-lever and a trip-rod pivotally connected with such trip-lever and with a shifter; of a shifter operative by said bucket-closers, alternately, for shifting the corresponding trip-rod to its inoperative position and the other trip-rod to its operative position.

11. The combination with a pair of automatic weighing-machines having buckets, bucket-closers, latches for said closers, and latch-trippers, each having a valve-operated trip-lever and a trip-rod pivotally connected with such trip-lever and with a shifter; of a shifter operative by said bucket-closers, alternately, for shifting the corresponding trip-rod to its inoperative position and the other trip-rod to its operative position.

12. The combination with a pair of automatic weighing-machines having shiftable load-dischargers, latches for said load-dischargers, and separately-effective latch-trippers; of a latch-tripper shifter operative by said load-dischargers, alternately, for shifting the corresponding latch-tripper to its inoperative position and the other latch-tripper to its operative position; a latch-tripper actuator shiftable into and out of operative relation with said latch-trippers transversely to said shifter; and a pair of stops carried by the shifter at opposite sides of said latch-tripper actuator and operative alternately for engaging and supporting said actuator when in its operative position.

13. The combination with a pair of automatic weighing-machines having shiftable load-dischargers, latches for said load-dischargers, and separately-effective latch-trippers; of a latch-tripper shifter operative by said load-dischargers, alternately, for shifting the corresponding latch-tripper to its inoperative position and the other latch-tripper to its operative position; a latch-tripper actuator shiftable into and out of operative relation with said latch-trippers transversely to said shifter; and a pair of by-pass stops carried by the shifter at opposite sides of said latch-tripper actuator and operative, alternately, for engaging and supporting said actuator when in its operative position.

14. The combination with a pair of automatic weighing-machines having shiftable load-dischargers, latches for said load-dischargers, and separately-effective latch-trippers; of a latch-tripper shifter operative by said load-dischargers, alternately, for shifting the corresponding latch-tripper to its inoperative position and the other latch-tripper to its operative position; a latch-tripper actuator normally in inoperative relation with said latch-trippers; a discharge-chute common to said machines; means for supporting a load-receiver adjacent to said chute; and means, operative by the placing of a load-receiver in position, for carrying the latch-tripper actuator into operative relation with the latch-trippers.

15. The combination with a pair of automatic weighing-machines having shiftable load-dischargers, latches for said load-dischargers, and separately-effective latch-trippers; of a latch-tripper shifter operative by said load-dischargers, alternately, for shifting the corresponding latch-tripper to its inoperative position and the other latch-tripper to its operative position; a latch-tripper actuator normally in inoperative relation with said latch-trippers; a discharge-chute common to said machines; box-guiding means adjacent to said chute; and an operating-arm normally projecting into the path of the box to be filled and operatively connected with the latch-tripper actuator and adapted to be forced outward by the box to thereby carry the latch-tripper actuator into operative relation with the latch-trippers.

16. The combination with a pair of automatic weighing-machines having shiftable load-dischargers, latches for said load-dischargers, and separately-effective latch-trippers; of a latch-tripper shifter operative by said load-dischargers, alternately, for shifting the corresponding latch-tripper to its inoperative position and the other latch-tripper to its operative position; a latch-tripper actuator normally reactive into inoperative relation with said latch-trippers; a discharge-chute common to said machines; means for supporting a load-receiver adjacent to said chute; and means operative by the placing of a load-receiver in position, for carrying the latch-tripper actuator into operative relation with the latch-tripper.

FRANCIS H. RICHARDS.

Witnesses:
FRED. J. DOLE,
HEATH SUTHERLAND.